United States Patent
Wang et al.

(10) Patent No.: US 8,885,364 B2
(45) Date of Patent: Nov. 11, 2014

(54) FLYBACK CONVERTER WITH PRIMARY SIDE AND SECONDARY SIDE FEEDBACK CONTROL AND METHOD FOR THE SAME

(75) Inventors: Kuan-Sheng Wang, Hsinchu County (TW); Wei-Chan Hsu, Hsinchu County (TW); Jan-He Li, Hsinchu County (TW)

(73) Assignee: Neoenergy Microelectronics, Inc., Chupei, Hsinchu County (TW)

( * ) Notice: Subject to any disclaimer, the term of this patent is extended or adjusted under 35 U.S.C. 154(b) by 378 days.

(21) Appl. No.: 13/432,921

(22) Filed: Mar. 28, 2012

(65) Prior Publication Data
US 2012/0250366 A1 Oct. 4, 2012

(30) Foreign Application Priority Data
Mar. 28, 2011 (TW) .............................. 100110604 A

(51) Int. Cl.
*H02M 3/335* (2006.01)
*H02M 1/00* (2006.01)

(52) U.S. Cl.
CPC ............ *H02M 3/33523* (2013.01); *Y02B 70/16* (2013.01); *H02M 2001/0032* (2013.01)
USPC ..................................... 363/21.16; 363/21.15

(58) Field of Classification Search
USPC .......... 363/21.01, 21.07, 21.08, 21.09, 21.12, 363/21.15, 21.16, 21.17, 97
See application file for complete search history.

(56) References Cited

U.S. PATENT DOCUMENTS

2003/0042879 A1* 3/2003 Huh et al. ..................... 323/282

\* cited by examiner

*Primary Examiner* — Gary L Laxton
(74) *Attorney, Agent, or Firm* — Muncy, Geissler, Olds & Lowe, P.C.

(57) ABSTRACT

A flyback converter with primary side and secondary side feedback control includes a transformer, a secondary-side feedback unit and a feedback control unit. The secondary-side feedback unit is electrically connected to a secondary winding of the transformer and comprises an isolated signal transceiver device and an error amplifier. The feedback control unit is electrically connected to an auxiliary winding of the transformer and operatively connected to the isolated signal transceiver device. When the flyback converter is operated in heavy load conditions, the feedback control unit receives a secondary feedback control signal sent from the isolated signal transceiver device for feedback control. When the flyback converter is operated in light load conditions, the feedback control unit receives a primary feedback control signal sensed by the auxiliary winding for feedback control.

20 Claims, 7 Drawing Sheets

FLYBACK CONVERTER WITH PRIMARY SIDE AND SECONDARY SIDE FEEDBACK CONTROL AND METHOD FOR THE SAME

BACKGROUND OF THE INVENTION

1. Field of the Invention

The present invention relates generally to a flyback converter, and more particularly to a flyback converter with primary side and secondary side feedback control.

2. Description of the Prior Art

The power supply used for electronic products generally requires electric isolation between an input end and an output end thereof. The electric isolation can be realized, for example, by a transformer, and one of the popular schemes is a flyback converter scheme. In the flyback converter scheme, the output power can be adjusted by controlling pulses applied to the primary winding of the converter. More particularly, the turn-on time of the pulses increases when the output power is to be increased, and the turn-on time of the pulses decreases when the output power is to be decreased.

FIG. 1 shows a schematic diagram of a prior art flyback converter with secondary feedback control. The prior art flyback converter shown in FIG. 1 comprises a full bridge rectifier 12A, a PWM controller 14A, a switch unit 16A, a transformer 20A, an output filter 32A and a feedback unit 30A. The full bridge rectifier 12A receives an AC input such as a wall socket power to generate a rectified power when the flyback converter is used in an AC-DC conversion application. The rectified power is connected to ground through the primary winding Wp and the switch unit 16A. Energy is coupled to the secondary winding Ws and the auxiliary winding Waux when the rectified power is delivered to the primary winding Wp. The secondary winding Ws send the coupled energy to a load (not shown) through the output filter 32A.

The feedback unit 30A senses an output power of the load (for example the feedback unit 30A senses the current or voltage of the load) to generate a feedback signal, and the feedback unit 30A sends the feedback signal to the PWM switch 14A. The PWM switch 14A controls the switch unit 16A based on the feedback signal or a control signal from an external control unit (not shown). In one popular implementation, the output voltage Vout is divided into a voltage Vdiv through a resistor network. The voltage Vdiv controls the shunt regulator TL431, which operates as an error amplifier and generates a current proportional to the difference of the voltage Vdiv and an internal regulated voltage in the shunt regulator TL431. The current generated will be converted into a feedback voltage and sent to the primary side through the optocoupler OPTO, thus stabilizing the flyback converter.

One effort for improvement of electronic products is to minimize power consumption in the standby operation in order to prolong battery operation time as environmental protection becomes a serious issue. For the above-mentioned flyback converter with secondary feedback control, an error amplifier and optocoupler are employed to send a feedback signal to the primary side and the output power needs continuous monitoring in standby mode. This consumes considerable electric power in the standby operation of the flyback converter with secondary feedback control.

FIG. 2 shows a schematic diagram of a prior art flyback converter with primary feedback. The flyback converter with primary feedback senses electric power of the auxiliary winding Waux by the PWM controller 14B to provide primary side feedback instead of monitoring secondary side power with the optocoupler. However, the flyback converter with primary feedback cannot precisely sense the output power from the load due to the nonlinear property of the transformer 20A and the feedback unit 30A. Moreover, the flyback converter with primary feedback control has the drawbacks of poor output regulation and inapplicability to high power (for example above 15 W) application. Besides, primary-side control does not work well in Continuous Current Mode (CCM). Many PWM converters operate at CCM mode when in heavy load condition hence primary-side control has its limitation.

As can be seen from above description, the prior art flyback converter lacks the ability to provide both primary side and secondary side feedback control, and cannot meet the requirements of power saving and precise control simultaneously.

SUMMARY OF THE INVENTION

It is an object of the present invention to provide a flyback converter with primary side and secondary side feedback control.

It is another object of the present invention to provide a method for flyback conversion with both primary side and secondary side feedback control.

Accordingly, the present invention provides a flyback converter with primary side and secondary side control. The flyback converter comprises a transformer having a primary winding, a secondary winding and an auxiliary winding electromagnetically coupled to each other. The flyback converter further comprises a secondary-side feedback unit operatively connected to the secondary winding and the primary winding, the secondary-side feedback unit comprising an isolated signal transceiver device and an error amplifier electrically connected to an output port of the flyback converter, the isolated signal transceiver device comprising a signal transmitter at the secondary side and a signal receiver at the primary side, the signal transmitter electrically connected to the error amplifier and sending a secondary feedback control signal to the signal receiver in an isolation matter wherein the secondary feedback control signal is in response to a load condition of the flyback converter, a primary side feedback control signal generated by the auxiliary winding, and a feedback control unit electrically connected to the primary side feedback control signal and the secondary feedback control signal such that the secondary-side feedback unit sends information of the load condition of the flyback converter through an isolation layer to the feedback control unit. The feedback control unit receives the secondary feedback control signal sent from the isolated signal transceiver device for feedback control when the flyback converter is operated in a heavy load condition. The feedback control unit receives a primary feedback control signal generated by the auxiliary winding for feedback control when the flyback converter is operated in a light load condition.

Accordingly, the present invention provides a method for flyback converter with primary side and secondary side control. A feedback control unit receives a secondary feedback control signal sent from the isolated signal transceiver device for feedback control when the flyback converter is operated in a heavy load condition, wherein the secondary feedback control signal is in response to a load condition of the flyback converter and sent from the isolated signal transceiver device through an isolation layer. The feedback control unit uses a primary feedback control signal sent from the auxiliary winding for feedback control if the secondary feedback control signal is lower than a predetermined level.

BRIEF DESCRIPTION OF DRAWINGS

The invention may be best understood by reference to the following detailed description of the invention, which describes certain exemplary embodiments of the invention, taken in conjunction with the accompanying drawings in which.

DETAILED DESCRIPTION OF THE INVENTION

Figure 1:
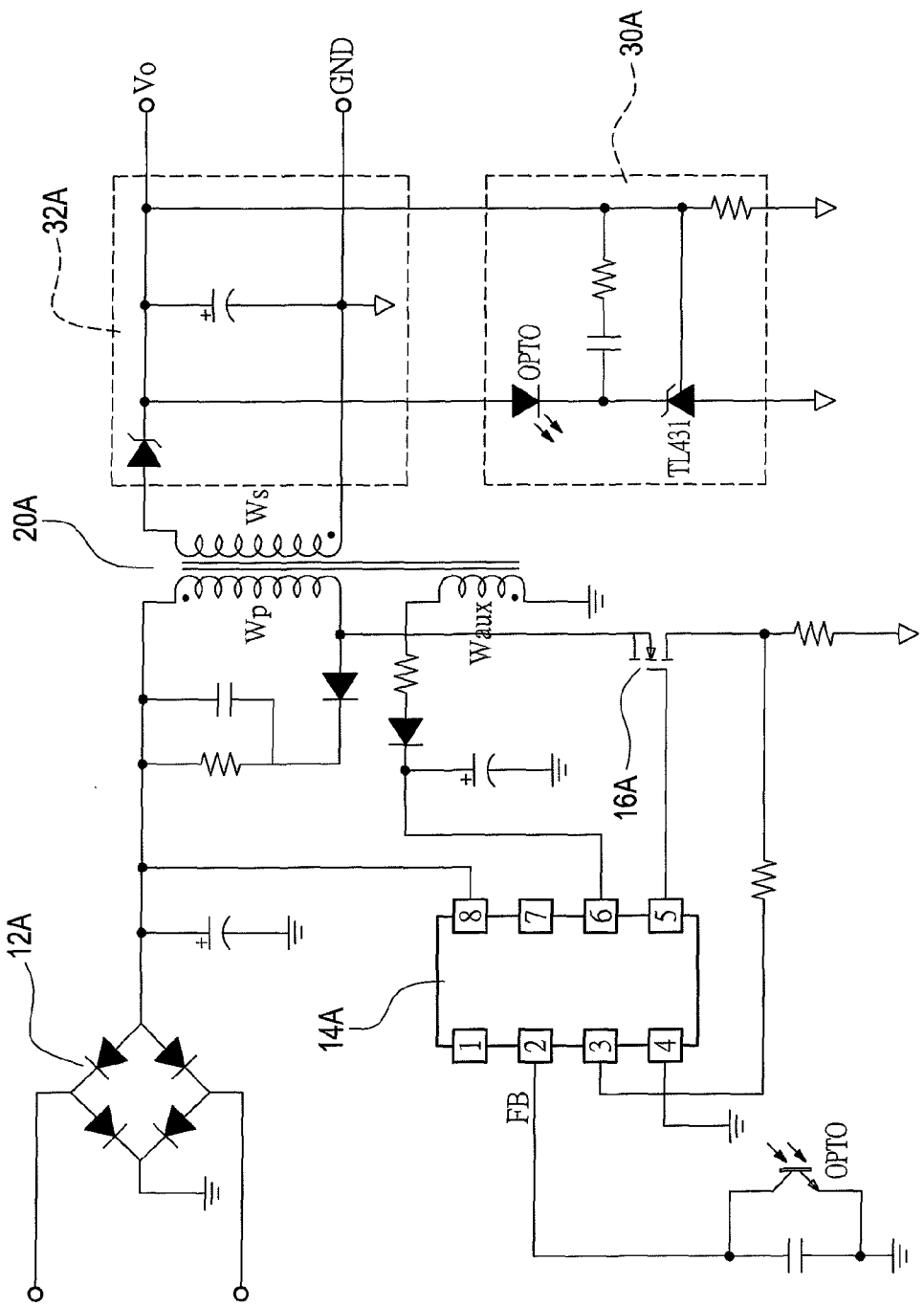
FIG. 1 shows a schematic diagram of a prior art flyback converter with secondary feedback control.
Figure 2:
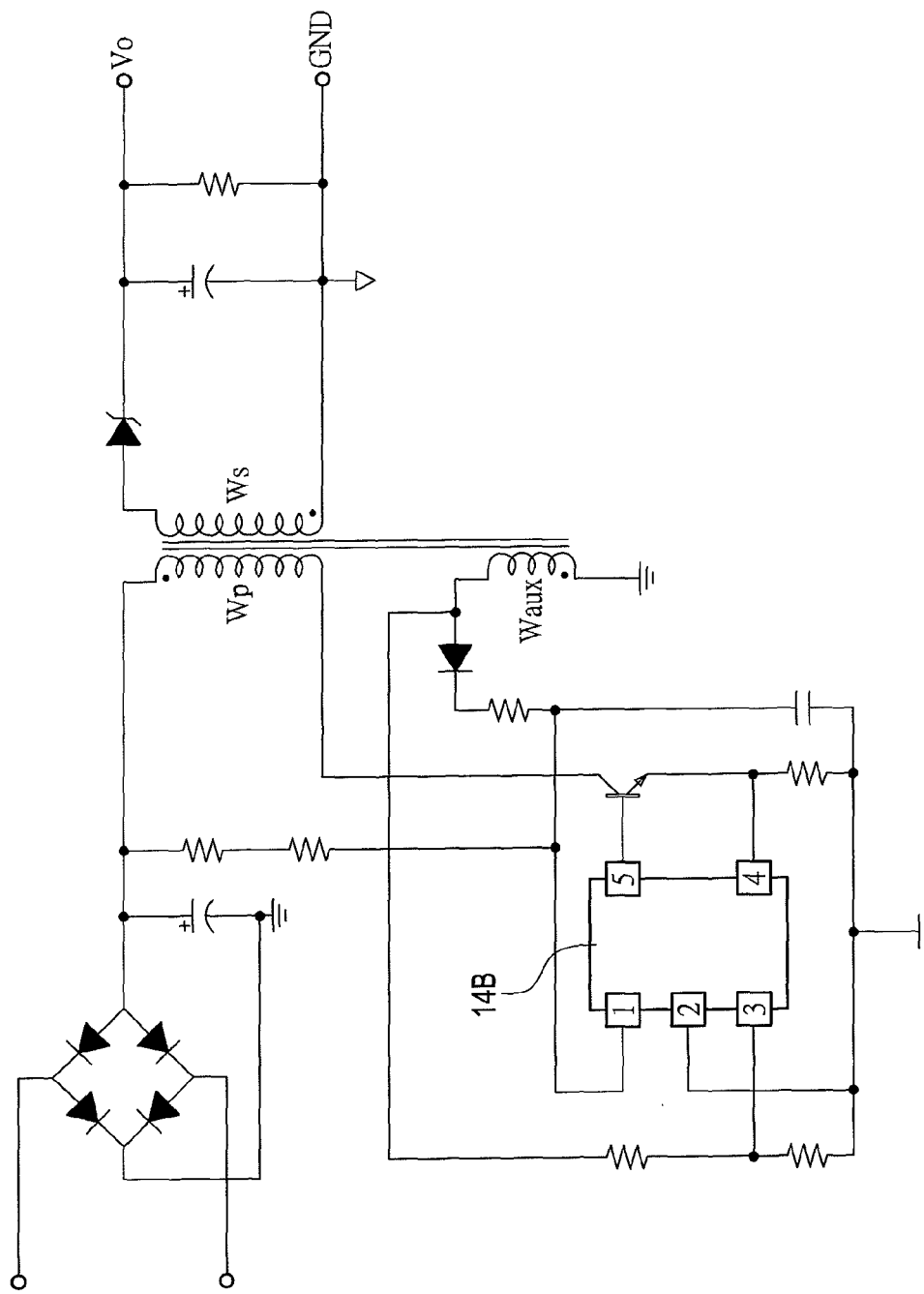
FIG. 2 shows a schematic diagram of a prior art flyback converter with primary feedback.
Figure 3A:
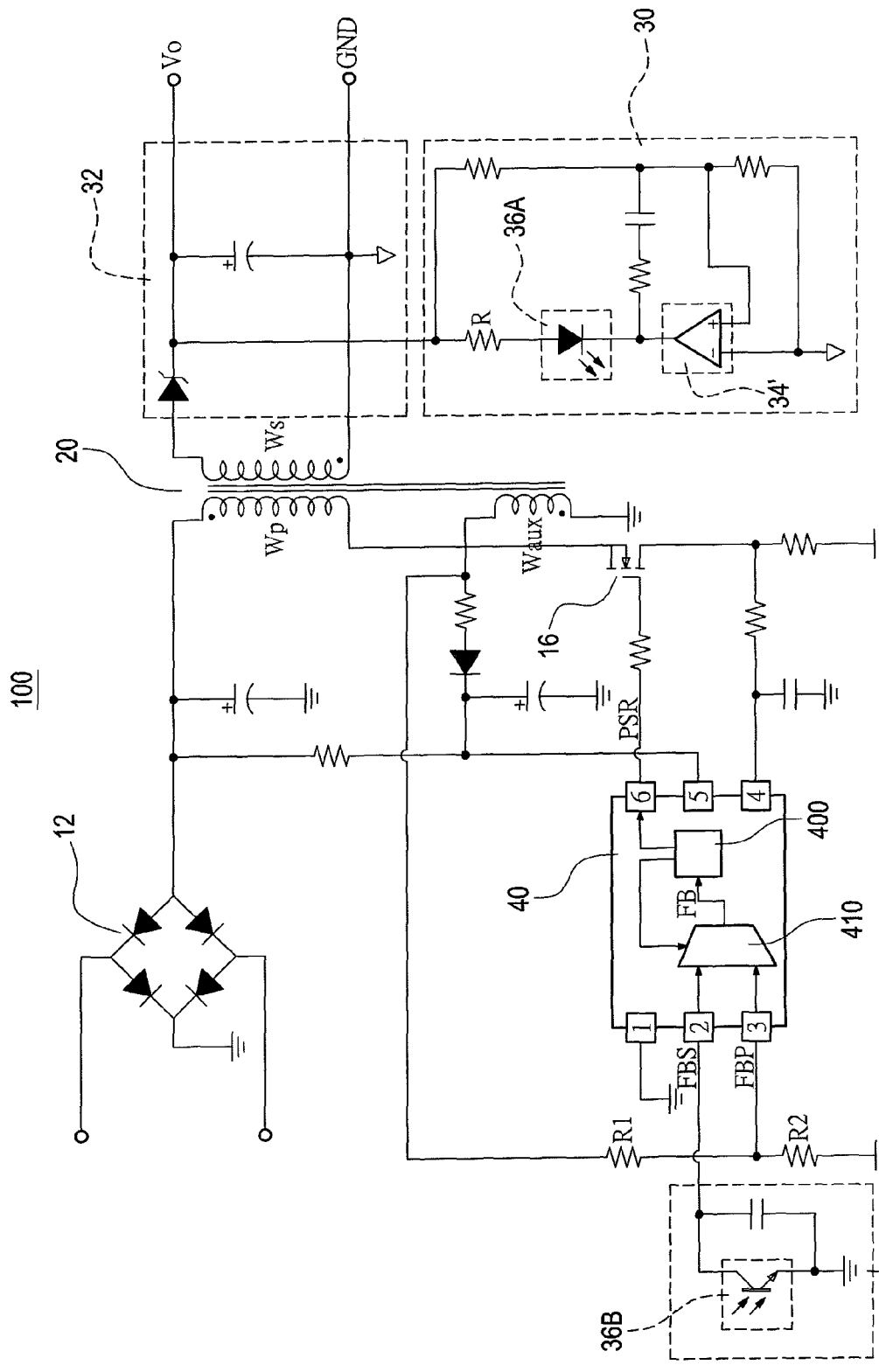
FIG. 3A shows the circuit diagram of the flyback converter with primary side and secondary side feedback control according to a first preferred embodiment of the present invention.

FIG. 3A shows the circuit diagram of the flyback converter with primary side and secondary side feedback control according to a first preferred embodiment of the present invention. The shown flyback converter 100 with primary side and secondary side feedback control mainly comprises a full bridge rectifier 12, a switch unit 16, a transformer 20, a secondary-side feedback unit 30, an output rectifier 32 and a feedback control unit 40. Those elements with similar numerals to those in FIG. 1 have a similar function, and the description thereof is omitted here for brevity.

As shown in FIG. 3A, the feedback control unit 40 has six pins. Pin 1 of the feedback control unit 40 is electrically connected to ground. Pin 2 of the feedback control unit 40 receives the secondary side feedback control signal FBS of the secondary-side feedback unit 30. Pin 3 of the feedback control unit 40 is electrically connected to the auxiliary winding Waux through a voltage division circuit composed of resistors R1 and R2, and receives the primary side feedback control signal FBP. Pin 4 of the feedback control unit 40 is electrically connected to the source terminal of the switch unit, 16, which is connected to the ground through a sense resistor and is used for current sensing. The voltage across the resistor is proportional to the current through the switch unit 16. Pin 5 of the feedback control unit 40 is electrically connected to the auxiliary winding Waux through a resistor and diode to obtain the operation voltage for the feedback control unit 40. Pin 6 of the feedback control unit 40 is electrically connected to the gate of switch unit 16 for outputting control signal PSR. Moreover, the feedback control unit 40 further comprises an internal controller 400 (such as a microprocessor 400) and a multiplexer 410. The multiplexer 410 selects one of the primary side feedback control signal FBP and the secondary side feedback control signal FBS as the feedback control signal FB for the microprocessor 400, where the selection depends on the load condition of the flyback converter. As shown in FIG. 3, the load condition can be, for example, determined by the microprocessor 400 and the microprocessor 400 sends command to the multiplexer 410 to select one of the primary side feedback control signal FBP and the secondary side feedback control signal FBS as the feedback signal FB. However, this is only one demonstrative example; the multiplexer 410 can get the load condition of the flyback converter through other approaches.

The secondary-side feedback unit 30 comprises a resistor R located at the secondary side and electrically connected to the output voltage V0, an error amplifier 34', and an isolated signal transceiver device 36 provided between the primary side and the secondary side. More particularly, the isolated signal transceiver device 36 includes a signal transmitter 36A at the secondary side, and a signal receiver 36B at the primary side, where the signal transmitter 36A communicates with the signal receiver 36B in signal isolation manner via optical transmission. More particularly, according to a preferred embodiment of the present invention, the isolated signal transceiver device 36 includes a light emitting diode 36A at the secondary side, and a photo diode 36B at the primary side, where the signal transmitter 36A communicates with the signal receiver 36B in signal isolation manner to prevent direct current path between the primary side and the secondary side. Moreover, the isolated signal transceiver device 36 can also be implemented by an inductive coupling device, capacitive coupling device, or acoustic transformer. Hereinafter, the operation of the flyback converter 100 is demonstrated with the isolated signal transceiver device 36 implemented by the light emitting diode 36A at the secondary side and the photo diode 36B at the primary side.

The light emitting diode 36A sends an optical signal indicating the level of the output voltage Vo to the photo diode 36B at the primary side, where the optical signal received by the photo diode 36B forms a secondary side feedback control signal FBS for the feedback control unit 40. The microprocessor 400 can judge the voltage level of the output voltage V0 according to the secondary side feedback control signal FBS and conducts feedback control. The voltage level of the control signal FBS indicates the loading condition. The higher the level of FBS, the heavier load the system is. The controller controls the output current according to the voltage level of FBS by keeping the output voltage Vo substantially constant.

Figure 3B:
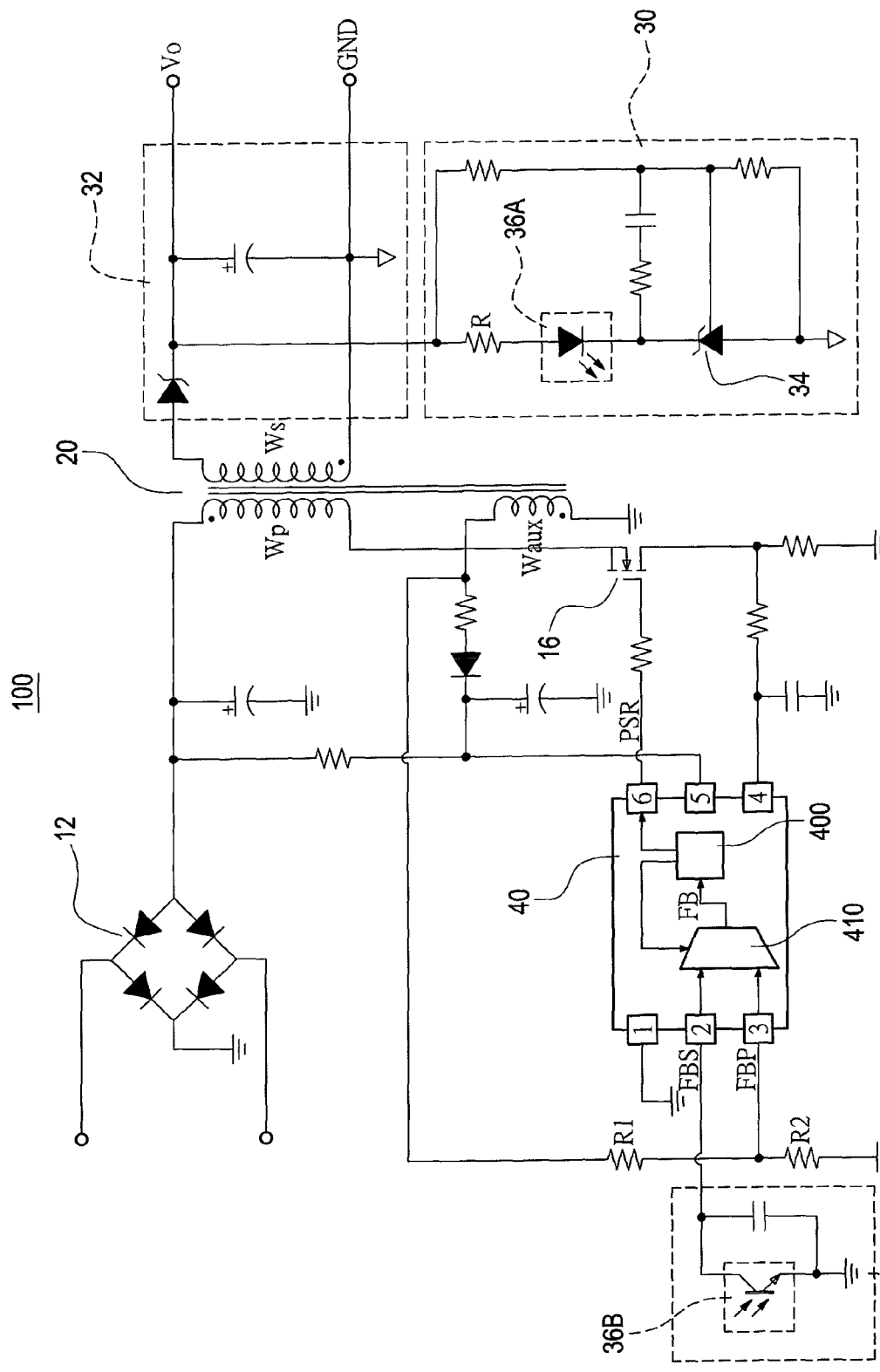
FIG. 3B shows the circuit diagram of the flyback converter with primary side and secondary side feedback control according to a slight modification of the first preferred embodiment of the present invention, where the error amplifier in FIG. 3A is replaced by a shunt regulator.

FIG. 3B shows the circuit diagram of the flyback converter with primary side and secondary side feedback control according to a slight modification of the first preferred embodiment of the present invention. The circuit elements shown in FIG. 3B are substantially the same as those shown in FIG. 3A except that the error amplifier 34' in FIG. 3A is replaced by a shunt regulator 34. It should be noted that the shunt regulator is one example of error amplifier which is suitable for optocoupler since its output is current.

Figure 5:
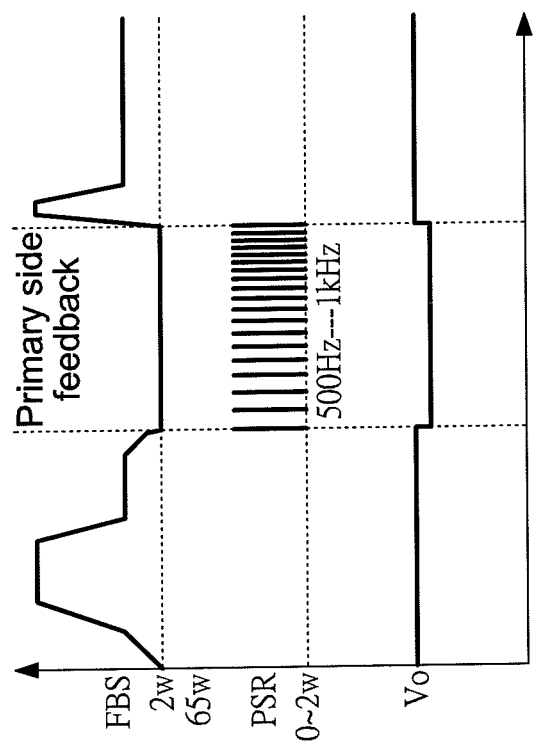
FIG. 5 shows the operational waveform of the flyback converter with primary side and secondary side feedback control according to a first preferred embodiment of the present invention.

FIG. 5 shows the operational waveform of the flyback converter with primary side and secondary side feedback control according to a first preferred embodiment of the present invention. After the flyback converter 100 is powered on and operated in heavy load conditions (such as 2-65 Watts), the secondary side feedback control signal FBS accordingly has a relatively higher level. The feedback control unit 40 mainly receives the secondary side feedback control signal FBS for feedback control. When the load power of the flyback converter 100 decreases, the level of the secondary side feedback control signal FBS also decreases. The feedback control unit 40 judges that the output of the flyback converter 100 changes from heavy load conditions to light load conditions (for example, the load is below 2 Watts) when the level of the secondary side feedback control signal FBS drops to a predetermined level (for example, 0.3 V). In this condition, the feedback control unit 40 selects the primary side feedback control signal FBP of pin 3 as feedback control signal FB, where the pin 3 of the feedback control unit 40 is electrically connected to the auxiliary winding Waux through a voltage division circuit composed of resistors R1 and R2. Moreover, the feedback control unit 40 can further control switch unit 16 to reduce the output voltage level by a predetermined amount when the feedback control unit 40 uses the primary side feedback control signal FBP instead of the secondary side feedback control signal FBS. The reduction of the output voltage reduces the power consumption of secondary side control circuits as well as the supply voltage of the controller 40, hence the power consumption of the flyback converter 100 can be further reduced.

In light load conditions, the flyback converter 100 delivers a relatively low power such as 2 Watts, which is much lower than the rated power of the flyback converter 100. Therefore, the flyback converter 100 can be operated in a power-saving mode. In the power saving mode, at least the light emitting diode 36A of the isolated signal transceiver device 36 can be turned off to save power consumption. The flyback converter 100 according to the present invention does not have the voltage regulation problems encountered in prior art flyback converters. When the flyback converter 100 changes to light load conditions, the output voltage level of the flyback converter 100 is further reduced by a predetermined amount. The power consumption of the flyback converter 100 is reduced while the operation of the flyback converter 100 is scarcely influenced. With reference to FIG. 3, the decrease in output voltage of the flyback converter 100 can advantageously reduce current flowing through the light emitting diode 36A and the shunt regulator 34, thus further saving power consumption.

Besides the above voltage reduction approach, the resistance values of the resistors R1 and R2 of the voltage division circuit can be purposely designed such that the load condition reported by the signal fed to pin 3 of the feedback control unit 40 is slightly different from that information acquired from secondary side feedback control signal FBS at the moment of load condition switching. In this regard, the feedback control unit 40 sends corresponding control signal PSR to the switch unit 16 to further reduce the output voltage level by a predetermined amount. Alternatively, the turn ratio of the transformer 20 (such as the turn ratio of the primary winding Wp and the auxiliary winding Waux) can be purposely designed such that the load condition reported by the signal fed to pin 3 of the feedback control unit 40 is slightly different from that information acquired from secondary side feedback control signal FBS at the moment of load condition switching. The output voltage level of the flyback converter 100 can also be reduced at the moment of load condition switching.

After the moment of load condition switching, the feedback control unit 40 relies on the primary side feedback control signal FBP fed from the auxiliary winding Waux through the resistors R1 and R2 of the voltage division circuit. Moreover, the feedback control unit 40 adopts pulse frequency modulation (PFM) and sends control signals PSR as shown in FIG. 5 to control the switch unit 16. Alternatively, the feedback control unit 40 adopts voltage level sensing to control the switch unit 16. In a PFM scheme, the feedback control unit 40 sends pulses with fixed turn-on time and with frequency changing according to the load condition. For example, the frequency of the PFM signals can be 500 Hz or less when the output load is zero; the frequency of the PFM signals can be 1 KHz or less when the output load is 2 W.

As shown in FIG. 5, the feedback control unit 40 judges that flyback converter 100 changes from a light load condition to a heavy load condition when the frequency of the output PFM signals increases to a predetermined threshold. The feedback control unit 40 then selects the secondary side feedback control signal FBS for feedback control. Simultaneously, the output voltage V0 is not subjected to the voltage decrease processing and the light emitting diode 36A and the shunt regulator 34 have a normal function. The feedback control unit 40 has precise feedback control in a heavy load condition.

Figure 4:
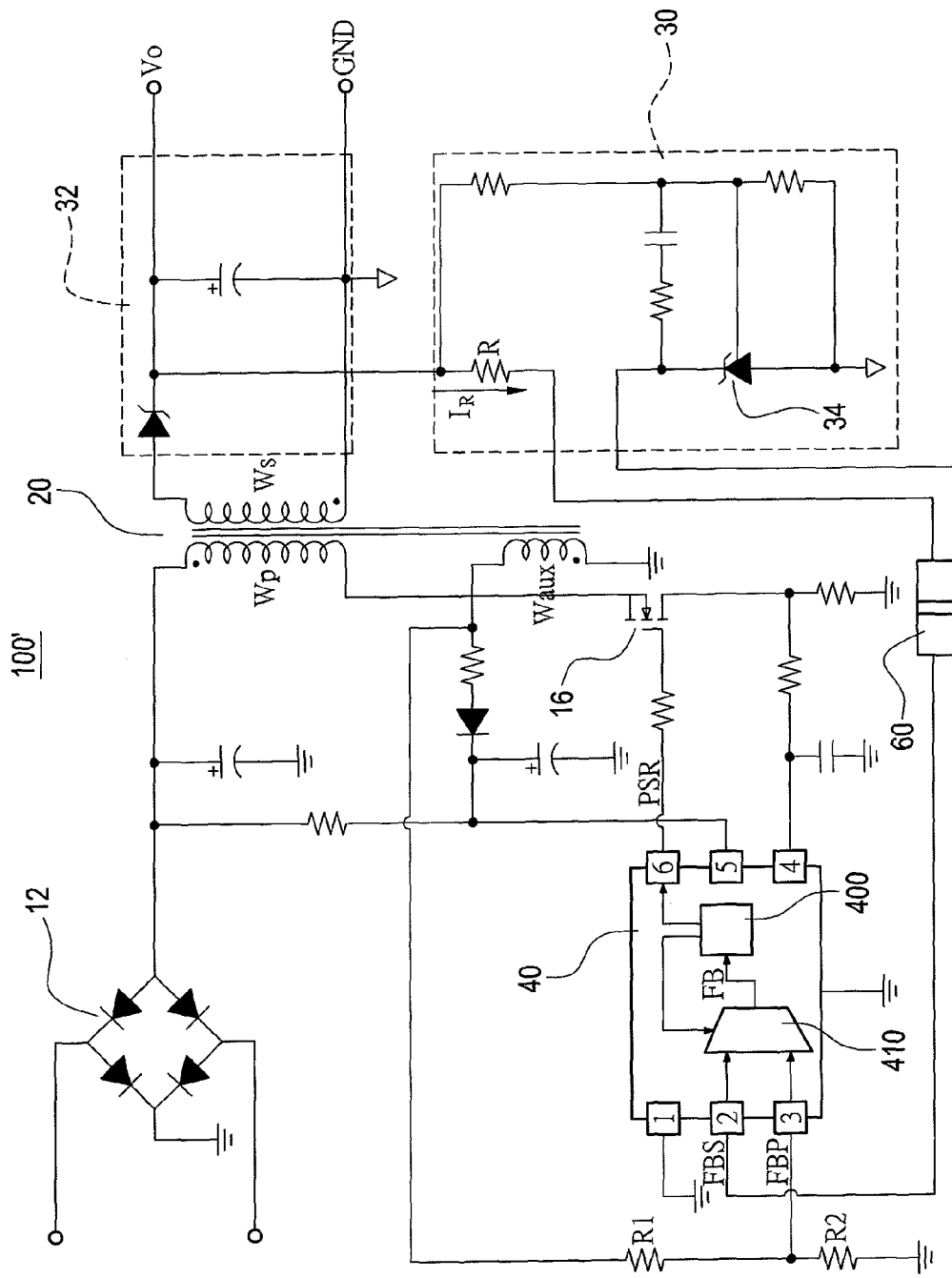
FIG. 4 shows the circuit diagram of the flyback converter with primary side and secondary side feedback control according to a second preferred embodiment of the present invention.

FIG. 4 shows the circuit diagram of the flyback converter with primary side and secondary side feedback control according to a second preferred embodiment of the present invention. The shown flyback converter 100' has similar elements to that shown in FIG. 3 except that a bidirectional isolated signal device 60 is provided between the primary side and the secondary side for bidirectional signal isolation. The bidirectional isolated signal device 60 comprises at least a signal transmitter at the secondary side and a signal receiver at the primary side, where the signal transmitter and the signal receiver communicate in a signal isolation manner. When the load of the flyback converter 100' is heavy, the bidirectional isolated signal device 60 measures the current $I_R$ flowing through the resistor R and sends the measurement result to the signal receiver at the primary side through the signal transmitter at the secondary side. The feedback control unit 40 receives the measurement result through the pin 2 thereof for feedback control.

Figure 6:
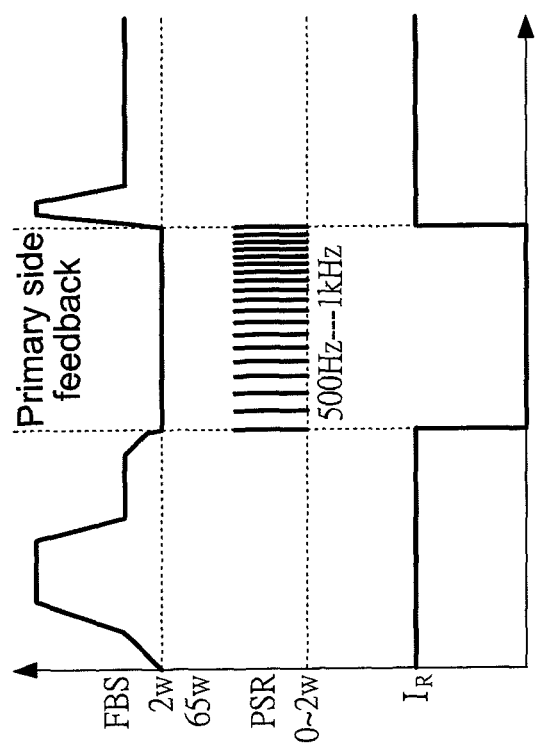
FIG. 6 shows the operational waveform of the flyback converter with primary side and secondary side feedback control according to a second preferred embodiment of the present invention.

When the load of the flyback converter 100' changes from a heavy load to a light load, the feedback control unit 40 controls the bidirectional isolated signal device 60 to cut out a connection path between the resistor R and the shunt regulator 34 to turn off the shunt regulator 34. As shown in FIG. 6, the current IR flowing through the resistor R is zero and the shunt regulator 34 is turned off to save power consumption.

At this time the feedback control unit 40 uses the primary side feedback control signal FBP for feedback control. When the load of the flyback converter 100' changes from a light load to a heavy load, the feedback control unit 40 controls the bidirectional isolated signal device 60 to resume the connection path between the resistor R and the shunt regulator 34. Therefore, the bidirectional isolated signal device 60 again measures the current $I_R$ flowing through the resistor R and sends the measurement result to the signal receiver at the primary side through the signal transmitter at the secondary side. The feedback control unit 40 receives the measurement result for precise feedback control.

To sum up, the flyback converter of the present invention has following advantages:

1. The flyback converter has primary side and secondary side feedback control and can select feedback control from these two feedback schemes according to the load condition.

2. The flyback converter uses a feedback voltage from the secondary side to switch its operation to primary side feedback control, and the flyback converter uses frequency sensing or voltage level sensing at the primary side to switch its operation to secondary side control. The primary side feedback control circuit can cut off the power source of the photo coupler at the primary side to reduce power consumption at the primary side.

3. The feedback control functions of the flyback converter are integrated in one controller IC. The controller IC sends on/off signals to cut off power consumption at the secondary side through an isolation device when the flyback converter is in primary side feedback control mode.

4. The flyback converter is feasible for high power application due to the dual feedback scheme (primary side and secondary side feedback). The power consumption of the standby mode operation can be reduced, especially for electronic devices with considerable standby time.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A flyback converter with primary side and secondary side control, the flyback converter comprising:
    a transformer having a primary winding, a secondary winding and an auxiliary winding electromagnetically coupled to each other,
    a secondary-side feedback unit operatively connected to the secondary winding and the primary winding, the secondary-side feedback unit comprising an isolated signal transceiver device and an error amplifier electrically connected to an output port of the flyback converter, the isolated signal transceiver device comprising a signal transmitter at a secondary side and a signal receiver at a primary side, the signal transmitter sends a secondary feedback control signal to the signal receiver through an isolation layer, wherein the secondary feedback control signal is in response to a load condition of the flyback converter, and
    a feedback control unit electrically connected to the auxiliary winding and the signal receiver such that the secondary-side feedback unit sends information of load condition of the flyback converter in isolation matter to the feedback control unit,
    wherein the feedback control unit receives the secondary feedback control signal sent from the isolated signal transceiver device for feedback control when the flyback converter is operated in heavy load conditions;
    wherein the feedback control unit receives a primary feedback control signal sensed by the auxiliary winding for feedback control when the flyback converter is operated in light load conditions.

2. The flyback converter of claim 1, wherein the isolated transceiver signal device is an optocoupler, the signal transmitter is a light emitting diode, and the signal receiver is a photo transistor.

3. The flyback converter of claim 2, wherein the feedback control unit is configured to operate the secondary-side feedback unit in a power saving mode when the feedback control unit receives the primary feedback control signal sensed by the auxiliary winding.

4. The flyback converter of claim 3, wherein the error amplifier is a shunt regulator, at least one of the light emitting diode and the shunt regulator is turned off when the secondary-side feedback unit is in the power saving mode.

5. The flyback converter of claim 3, wherein the error amplifier is a shunt regulator, at least one of the light emitting diode and the shunt regulator has reduced current when the secondary-side feedback unit is in the power saving mode.

6. The flyback converter of claim 1, wherein the isolated signal transceiver device is an inductor coupling device, a capacitive coupling device, an acoustic transformer, or a bidirectional isolated signal transceiver device.

7. The flyback converter of claim 1, wherein the feedback control unit is configured to send control signal in a pulse frequency modulation (PFM) manner.

8. The flyback converter of claim 1, wherein the feedback control unit is configured to send control signal in a voltage sensing manner.

9. The flyback converter of claim 7, wherein the feedback control unit is configured to judge that the flyback converter changes from light load operation to heavy load operation if the feedback control unit senses a frequency of the PFM control signal to be higher than a predetermined frequency.

10. The flyback converter of claim 1, wherein the feedback control unit is configured to judge that the flyback converter changes from heavy load operation to light load operation if the feedback control unit senses the secondary feedback control signal to be lower than a predetermined level.

11. A method for operating a flyback converter with primary side and secondary side control, the flyback converter comprising a transformer and a secondary-side feedback unit, the transformer having a primary winding, a secondary winding and an auxiliary winding electromagnetically coupled to each other, the secondary-side feedback unit having an isolated signal transceiver device and an error amplifier, the method comprising:
    a feedback control unit receiving a secondary feedback control signal sent from the isolated signal device for feedback control when the flyback converter is operated in heavy load condition wherein the secondary feedback control signal is in response to a load condition of the flyback converter and sent from the isolated signal transceiver device through an isolation layer; and
    the feedback control unit using a primary feedback control signal sent from the auxiliary winding for feedback control if the secondary feedback control signal is lower than a predetermined level.

12. The method of claim 11, wherein the isolated signal transceiver device is an optocoupler comprising a light emitting diode and a photo transistor.

13. The method of claim 12, wherein after the feedback control unit receives the primary feedback control signal sent from the auxiliary winding, the feedback control unit operates the secondary-side feedback unit in a power saving mode.

14. The method of claim 13, wherein the error amplifier is a shunt regulator, at least one of the light emitting diode and the shunt regulator is turned off.

15. The method of claim 13, wherein the error amplifier is a shunt regulator, at least one of the light emitting diode and the shunt regulator has reduced flowing current.

16. The method of claim 11, wherein the isolated signal transceiver device is an inductor coupling device, a capacitive coupling device, an acoustic transformer, or a bidirectional isolated signal device.

17. The method of claim 11, wherein the feedback control unit sends a control signal in pulse frequency modulation (PFM) manner.

18. The method of claim 11, wherein the feedback control unit sends a control signal in voltage sensing manner.

19. The method of claim 17, further comprising:
    the feedback control unit judging that the flyback converter changes from a light load operation to a heavy load operation if the feedback control unit senses a frequency of the PFM control signal to be higher than a predetermined frequency.

20. The method of claim 18, further comprising:
    the feedback control unit judging that the flyback converter changes from a light load operation to a heavy load operation by sensing voltage level; and the feedback control unit operating the flyback converter in heavy load mode.

* * * * *